Nov. 4, 1952 J. S. F. CARTER 2,616,909
CONTINUOUS FILTRATION PROCESS FOR SOLVENT EXTRACTION
OF CASTOR OIL FROM CASTOR SEEDS
Filed April 18, 1950 3 Sheets-Sheet 1

INVENTOR
James S. F. Carter
BY
Darby & Darby
ATTORNEYS

Nov. 4, 1952  J. S. F. CARTER  2,616,909
CONTINUOUS FILTRATION PROCESS FOR SOLVENT EXTRACTION
OF CASTOR OIL FROM CASTOR SEEDS
Filed April 18, 1950  3 Sheets-Sheet 2
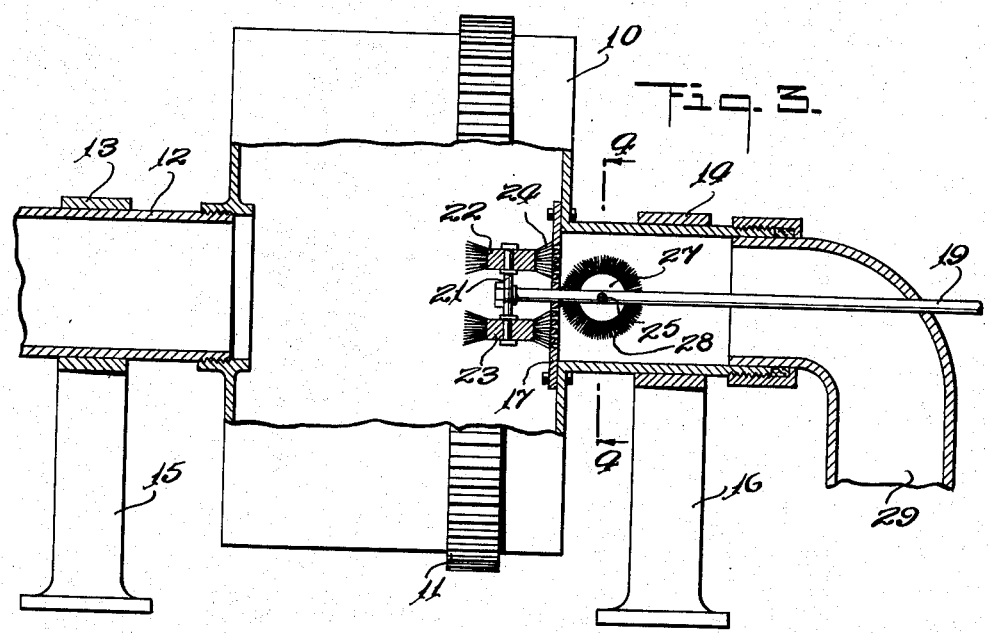
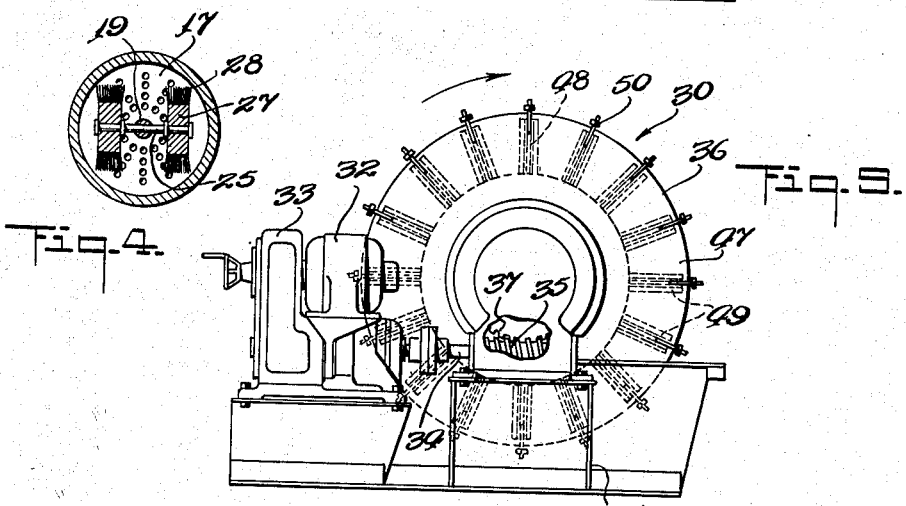
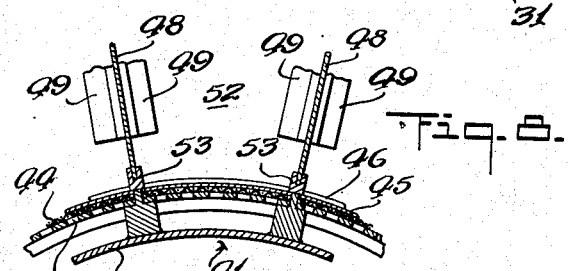
INVENTOR
James S. F. Carter
BY
Darby & Darby
ATTORNEYS

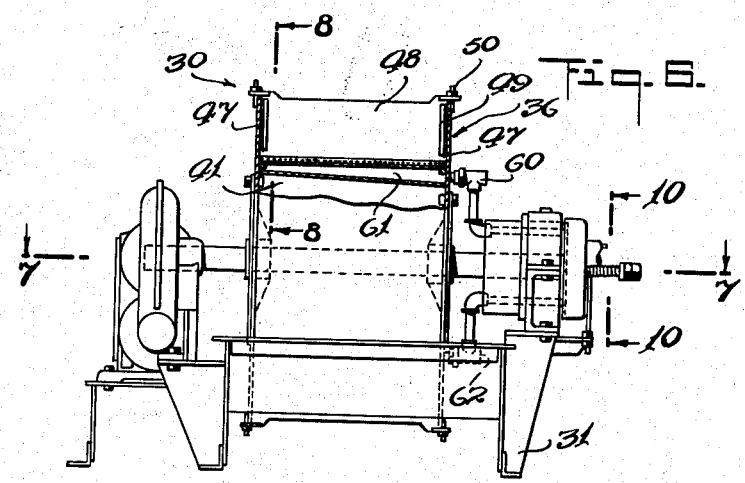
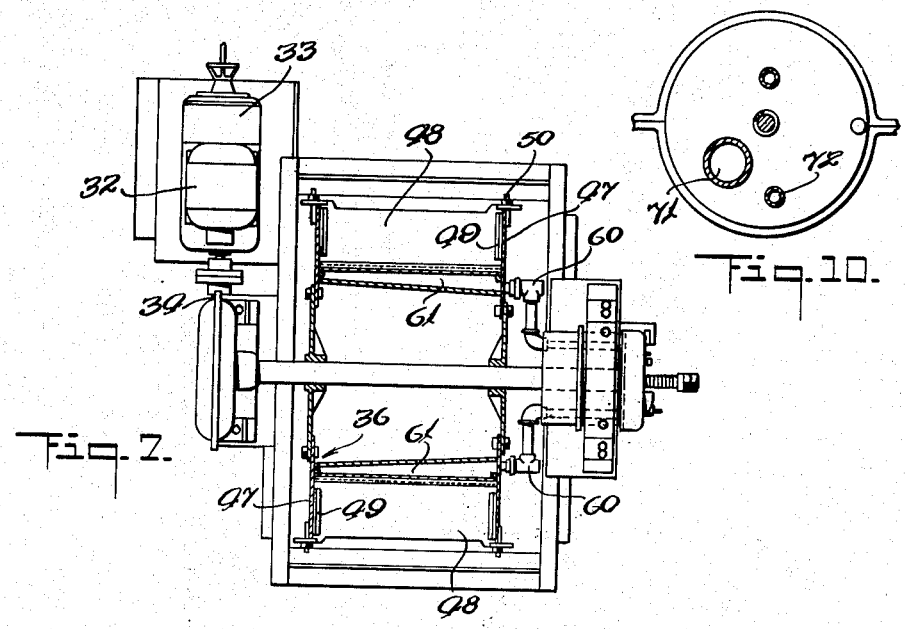
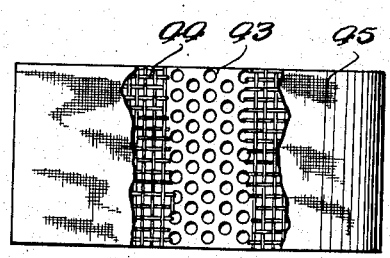

Patented Nov. 4, 1952

2,616,909

UNITED STATES PATENT OFFICE 2,616,909

CONTINUOUS FILTRATION PROCESS FOR SOLVENT EXTRACTION OF CASTOR OIL FROM CASTOR SEEDS

James S. F. Carter, Rockville Centre, N. Y., assignor to The Baker Castor Oil Company, Jersey City, N. J., a corporation of New Jersey Application April 18, 1950, Serial No. 156,703

5 Claims. (Cl. 260—412.4)

This invention provides a process for continuously extracting castor oil from castor seeds with the aid of solvents. The process of this invention consists of the following main steps: fine grinding of castor seed in a ball or other comminuting mill in the presence of a solvent, while continuously charging and discharging the mill; after converting the seed proteins to a non-gelatinous form, separation of the miscella from the pomace by means of a rotary vacuum filter.

One novel feature of this invention involves effecting the comminution of the castor seed in the presence of a solvent. The seed may be comminuted by a convenient machine, for example, a high speed rotary comminuting machine employing rotating blades, or, as herein described, by a ball mill. The seed and solvent are charged to the mill continuously in any desired ratio, and the resulting slurry is continuously discharged from the mill. An advantage of this milling operation is that, as soon as fresh surfaces of the seed are exposed by the action of the balls, the solvent can act thereon immediately. The ensuing yield of oil is greater than if the solvent were not present during the comminution, since, if the solvent were absent during this operation, it would be difficult for the solvent subsequently to penetrate the resulting gelatinous mass. The presence of the solvent also aids in effecting the discharge of the comminuted seed from the mill. Further, if the temperature in the mill is over about 80° F., an additional advantage results, namely, the extraction of oil from the seed is accomplished to a high degree in the ball mill.

Another step in this continuous process involves converting the seed proteins to a non-gelatinous form. This step can be effected by e. g., heating the slurry of seed and solvent produced in the initial comminution step to a temperature in the range from about 150° to about 180° F. It has been found that heating of the slurry at the indicated temperatures results in the conversion of the protein present in the seed into a granular form. As a result, the subsequent separation of solids (pomace) from the miscella by filtration can be readily and quickly effected in a continuous maner. If the slurry is not heated to the indicated temperatures, the protein remains in a slimy condition, and, thereby, renders any separation of the pomace from the miscella extremely difficult. If the slurry is heated to a temperature above the indicated range, the properties of the products formed by the process of this invention are adversely affected; e. g., undesirable discoloration of the oil results; also the solvent may be vaporized to an undesirable extent unless special equipment is provided.

The present process may be practiced either with seed which has been decorticated or with seed in which the majority or all of the hulls remain associated with the solids of the feed material throughout the processing steps. It has been found that, when the seeds are initially substantially decorticated, the oil produced by the process of this invention has superior color, the free fatty acid content is greatly reduced, and the required filter area may be reduced by a factor of approximately one-half. When it is desired to operate the process with seed which has not been dehulled to a substantial extent, better filtration rates were accomplished due to the presence of the hull fragments; also, there is a saving in time and energy requirements through omission of the decorticating step.

Another novel feature of this invention is the continuous separation of solids from the miscella by filtration. A rotary hopper dewaterer, more fully described hereinafter, has been adapted and found to be highly effective for this separation. Since this equipment functions automatically, it can readily be operated in a continuous manner, and, in addition, is useful from a labor-saving standpoint.

A typical practical working procedure for processing castor seed according to the process of this invention is presented in the following example, although it is to be understood that the invention is not limited to the procedure, or materials used, in this example.

Referring to the accompanying drawings, illustrative embodiments of the invention are shown as follows:

Figure 1 is a flow sheet diagram of the essential steps in the process together with certain other steps desirable to a complete continuous solvent extraction process as disclosed in the copending application of I. M. Colbeth, Serial No. 156,701 filed April 18, 1950, including conventional illustration of the apparatus;

Figure 3 is a cross section of the ball mill with associated cleaning device;

Figure 4 is a cross section taken along the line 4—4 of Figure 3;

Figure 5 is an elevation, partly in cross section, of a rotary hopper dewaterer or rotary compartment suction filter;

Figure 6 is a vertical cross section of the apparatus shown in Figure 5;

Figure 7 is a horizontal cross section taken along the line 7—7 of Figure 6;

Figure 8 is a detail of a portion of the dewaterer showing a fragmentary view of the filter drum with associated compartments;

Figure 9 is a fragmentary view of various layers of the filter drum; and

Figure 10 is an end elevation view, partly in section, taken along the line 10—10 of Figure 6.

Figure 1:
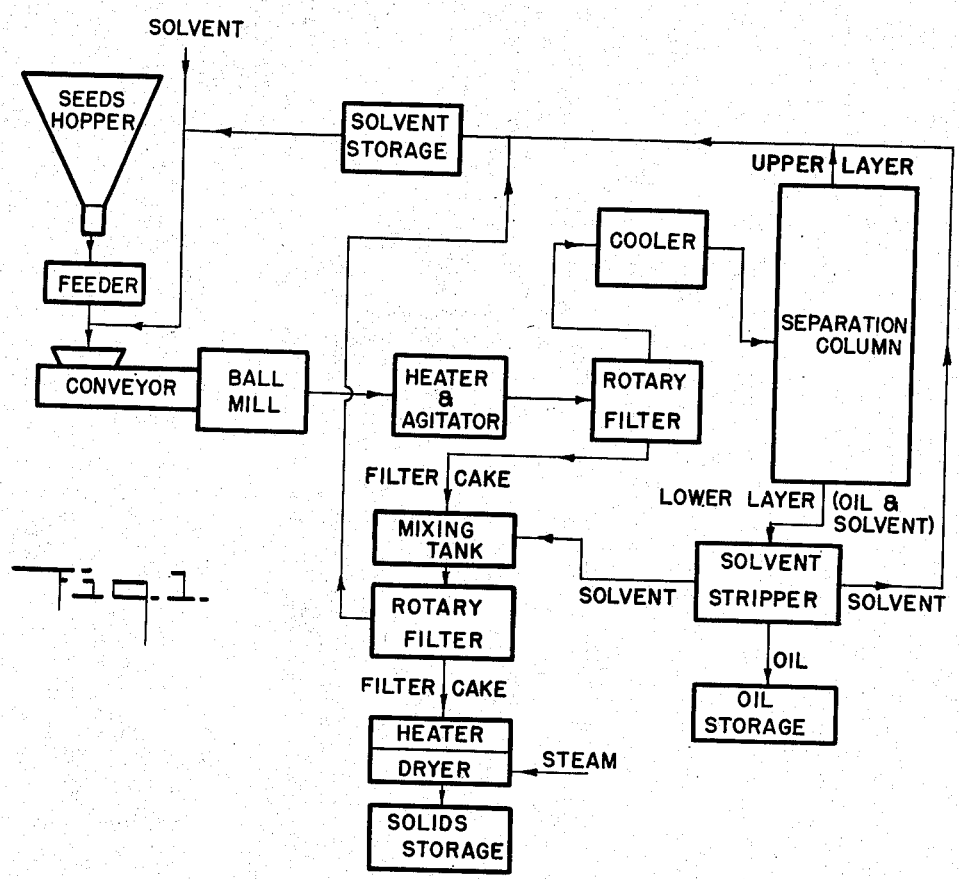

Referring to Figure 1, as explained above, the steps in a complete continuous solvent extraction process for the production of castor oil from castor seeds may include the following operations, including those steps which constitute the instant invention. The seeds are introduced from a feeder together with solvent onto a conveyor which is preferably of the screw type. This mixture of seeds and solvent is fed into the ball mill, after which it is directed into a heater and agitator and thence to a rotary filter to be described later in more detail. The filtrate leaves the rotary filter and is passed through a cooler into a separation column or decanter wherein an upper layer and a lower layer are separated. The upper layer consists primarily of a solvent with a small amount of oil and is fed back to the solvent storage tank preferably after a further distillation stage for purification of the solvent. The lower layer within the separation column, which consists of relatively high concentration of oil in the solvent, is fed to a solvent stripper whence part of the solvent is redirected back into the initial stage of the cycle, i. e., via solvent storage. Another portion of the solvent is fed to the mixing tank wherein it is mixed with the filter cake from the rotary filter. After further contacting of solvent with the filter cake, the mixture is introduced into a second rotary filter whence the solvent with relatively small percentage of oil is fed back into the solvent storage tank again preferably after a distillation stage for purification. The residual cake from the second rotary filter is fed into a heater and a dryer, and, after steaming, is deposited in a solids storage container. The oil from the solvent stripper is collected in an oil storage tank.

Figure 2:
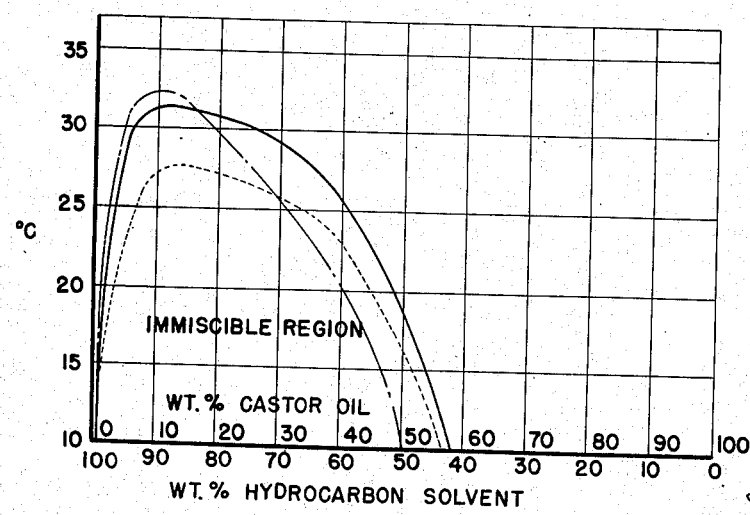
Figure 2 is a chart showing the miscibility relationship between castor oil and various hydrocarbon solvents at various concentrations and temperatures.

Referring to Figure 2, the curve shows the range of temperatures in degrees centigrade below which castor oil becomes immiscible with various hydrocarbon solvents, depending upon the relative concentration by weight of castor oil to hydrocarbon solvent. The solid curve is for heptane; the dotted curve is for hexane; and the dot-dash curve is for naphtha having a distillation range between about 150° F. and 280° F. For example, it is apparent that at temperatures above about 29° C., 30% by weight of castor oil in 70% by weight of heptane produces a compatible or miscible mixture, whereas below about 29° C., the same solution divides into two layers, the upper layer comprising primarily heptane and the lower layer comprising primarily castor oil.

Referring to Figure 3, a typical ball mill having a drum 10 is driven by suitable drive means in communication with ring gear 11 secured to the drum. Input pipe 12 preferably has a screw conveyor (not shown) for insuring constant feed of the seed-solvent mixture into the ball mill. Trunnions 13 and 14 are supported on uprights 15 and 16, respectively, and the outlet plate 17 of the ball mill is perforated, the size of the perforations being such that insufficiently ground seed is retained, the minimum diameter of the perforations being between one-quarter and three-eighths inch. A fixed shaft 19 terminates inside the ball mill drum 10 and supports a shaft 21 upon which a pair of rotary brushes 22, 23 may rotate, as the bristles 24 contact the rotating plate 17. A transverse shaft 25 is mounted on fixed shaft 19 outside the ball mill drum 10 and holds at its ends another pair of shafts, one shown at 26, upon which a brush 27 rotates, its bristles 29 being in contact with the exterior of the plate 17. Rotation of the drum, and hence of the plate 17, frictionally drives the cleaning brushes, thereby preventing clogging of the perforations in the plate 17. It is to be noted that the perforations in the plate are preferably flaring in the direction of flow, which results in more rapid passage of the miscella and solids out of the ball mill. The mixture emerges through the delivery pipe 28 and thence into the heater and agitator (see Figure 1).

Figures 5–10 illustrate the rotary dewaterer 30 which is supported by frame 31 and driven by a motor 32 with appropriate reduction gear 33 which drives shaft 34 (see Figure 5) having a worm pinion gear 35 which drives the assembly 36 by a rotary rack 37.

The dewaterer 30 is a more or less conventional rotary drum filter, with the usual internal suction means. The filter drum 41 has a frame 42 supporting a rigid perforated cylinder 43 over which is preferably superposed in contact therewith a backing screen 44 on which is superposed a filter cloth 45. Retaining ring 46 is provided to hold the filter assembly in rigid position around the filter drum. Referring especially to Figures 6 and 7, the rotating assembly 36 includes end plates 47 which project considerably beyond the periphery of the filter drum 41 to provide walls for compartments extending radially from the drum. The compartments are further separated from each other by baffle plates 48 which are held in position by angle-bar guides 49 supported by end plates 47 and which are locked by bolts 50 secured to the end plates 47. As may be seen from Figure 8, each compartment 52 is separated from its adjacent compartment by the partition plates or baffles 48 which preferably fit into grooves in resilient sealing members 53 below the guides 49.

The mixture to be filtered is introduced onto the top portion of the dewaterer 30 as shown in Figure 6, and as the assembly 36 rotates, the material does not roll off the filter cloth 45 during travel over the upper segment of rotation of the filter, since it is held in the compartments 52 by the baffle plates. Suction is applied through pipes 60 to withdraw the filtrate from the mixture into compartments 61, each of which corresponds to the compartments 52 outside the filter drum. As the filter assembly 36 rotates, so that the pipe 60 communicating with an individual compartment approaches the lowermost position in its path of travel as shown at 61, a conventional valve arrangement disconnects the pipe 60 from the suction line and connects it to a gas pressure pipe line (preferably an inert gas such as nitrogen) for blowing the filter cake out of the respective compartments 52 as they travel over the lower portion of their cycle. The operation, thus, of the rotary filter 30 is that during the upper portion of the cycle, the filter compartments 61 are under reduced pressure, thereby removing the filtrate from the mixture through the filter elements associated with the drum 30. As the compartment rotates past the horizontal position, and approaches its lowermost position, gas pressure is increased considerably above atmospheric in the compartment 61 and the filter cake is blown off of the drum, thereby releasing that segment of the drum for a new charge of slurry when it has reattained feeding position at the upper section of its cycle of travel.

Figure 10 shows that filtrate exit pipe 71, and blow pipe 72 which are successively connected to the respective pipes 60 in conventional fashion.

The arrangement of the filter in the present process has proved especially effective in carrying out the process of the present invention.

Example

In this example, the steps of the present invention are specifically illustrated in connection with a complete process of extracting castor oil from castor seed described on the basis of a pilot plant set-up handling 1 ton of castor seed in 24 hours. Castor seed, in general, contains approximately 25% hull, 25% protein-bearing material, and about 50% oil.

Castor seed is deposited in a hopper, and is withdrawn at a uniform rate by means of an automatic scale feeder. The amount of seed so withdrawn can be adjusted to any suitable rate of flow to the processing unit. The rate of withdrawal used in this instance is 82 lbs. of castor seed per hour, the seed being delivered by the moving belt of the feeder to a screw conveyor which transfers the seed to a steel ball mill. This transfer may be direct, or the seed may be decorticated prior to feeding into the ball mill. Power consumption is reduced by omitting the decortication step, but when this intermediate step is included, the color of the final oil product is improved, and the free flow of solid and liquid components through the system is enhanced, in that there is a markedly reduced tendency for the solids to separate by gravity in the lines.

A simultaneous charge to the ball mill is a paraffinic petroleum naphtha (bus naphtha), which is fed in at the rate of 1.3 gallons per minute (or 468 lbs. per hour); this rate is measured by the use of a rotameter. The naphtha, which has a distillation range of from 150 to 280° F., acts as the extracting solvent.

The ball mill runs continuously. The charge of balls occupies a volume which is approximately one-eighth of the total volume of the ball mill. The balls used are approximately from 2 to 3 inches in diameter, and are made of non-sparking, ceramic material such as porcelain. The ball mill has an internal diameter of 60 inches and an internal length of 48 inches, and is operated preferably at about room or slightly higher temperatures. The ball mill is so constructed that the feed (castor seed and solvent) enters it via a trunnion (the hollow shaft of which may act as a support for the ball mill) at one end of its axis; the ground slurry or pulp is discharged through a similar opening at the other end of the axis.

In the ball mill, the seed is ground (this being the primary function of the ball mill), and the castor oil is simultaneously extracted to some extent by the naphtha. A suitable degree of fineness of grind is about 20 mesh, that is, the particles are about $\frac{1}{16}$ to about $\frac{1}{8}$ of an inch in diameter. For ease of subsequent processing, it is desirable that the castor seed should not be ground any finer than about 20 mesh in the ball mill. If the seed particles are, on the average, finer than the indicated lower size limit, the filter used in the subsequent filtration of the slurry containing the fine particles tends to become clogged, and the resulting pomace is dusty and inconvenient to handle.

The slurry, which is discharged from the ball mill, flows from the mill to a holding tank which is supplied with a steam coil and an agitator, and which is sufficiently large to afford a holding time of at least about 30 minutes. The slurry is heated in this tank to a temperature of about 160° to about 170° F., and is stirred constantly so as to maintain the solids in suspension. At this elevated temperature, the protein content of the seed is denatured and, thereby, the ensuing filtration proceeds smoothly. There is no loss of solvent during this heating step as provision is made for the condensation of solvent vapors. The slurry is removed from this tank by means of a helical screw-type pump having a positive displacement action and is then delivered to a rotary hopper dewaterer wherein the liquids are separated from the solids (pomace).

The rotary hopper dewaterer, which has a filter area of about 18 square feet, separates the miscella from the pomace. The resulting filtrate obtained by the process of this invention consists of about 447 lbs. of naphtha and 41 lbs. of castor oil per hour, and, in the same period, the filter cake amounts to approximately 41 lbs. of pomace, 21 lbs. of residual naphtha, and 4 lbs. of castor oil.

The oil may be recovered from the filtrate in any desired manner. A distillation procedure may be used to evaporate the solvent from the filtrate. However, in the processing of castor seed to produce castor oil, it is preferable to use the chilling procedure detailed in the copending Colbeth and Carter application Serial No. 156,701, filed April 18, 1950.

Advantageous results accrue if, prior to the completion of the distillation step (which also constitutes part of the chilling procedure applicable to the production of castor oil), the oil is subjected to a refining treatment while in solution in the gasoline. In this case, the viscosity of the oil is reduced by the presence of the solvent, rather than by an increase in temperature; this is important, since the adsorption isotherm is not affected as much by the temperature as by the degree of dispersion of the constituents to be removed by the refining treatment. The refining treatment consists of acid and/or color removal. Acid removal can be accomplished readily by continuously contacting the oil solution with, e. g., sodium hydroxide solution, in a continuous neutralizer as disclosed in Colbeth U. S. Patent No. 2,183,486. Color removal can be effected by contacting the oil solution with suitable bleaching and filtering media, such as the acid-activated bleaching earths prepared from montmorillonite, e. g., "Neutrol" and "Filtrol"—products of the Filtrol Corporation, adsorptive clays consisting of hydrated aluminum and magnesium silicates, e. g., fuller's earth, and activated carbons, e. g., "Darco"—a product of the Darco Company. The earths or clays are suitably used in the amount of 2% per 100 lbs. of oil present, while the carbon black is advantageously used simultaneously in the amount of 0.5% on the same basis.

An enormous advantage as regards the color of the oil results from this bleaching of the oil in solution. Further color improvement can be achieved by decortication of the seed and separation of the hulls prior to subjecting the seed meats to the extraction operation.

The filter cake from the rotary filter is deposited in a small mixing tank, where it is re-slurried with solvent recovered from the stripping column. The final extraction of the oil occurs in this tank, the oil content of the pomace thus being reduced from about 8 to 10% to about 1%. The fresh slurry is then sent to a second rotary filter, having a filter area of about 12 square feet; the resulting filtrate is pumped to the used solvent tank for recirculation to the ball mill.

Steam may be applied to the second filter in order to drive off residual solvent from the filter cake. The cake is then discharged from the filter and sent to the storage hopper. If it is desired to remove the last traces of solvent from the filter cake, the latter is passed through a dryer, into which open steam is introduced, before being sent to storage. The heat treatment of the pomace, to steam off solvents at this stage, or to effect the coagulation of the proteins earlier in the process, results in the detoxification of those pomaces which contain toxic principles, so that they become suitable for use as a source of proteins in prepared animal feeds.

OPERATING CONDITIONS

Comminution

One of the important features of the ball mill operation is the continuous flow of the seed to the mill. There was originally some difficulty observed in getting the seed through the long trunnion into the ball mill. An aluminum screw conveyor which turns with the mill and draws the seed from the entrance point through the trunnion provides a satisfactory solution to this difficulty. However, care must be taken that the liquid level in the mill is not so high that the seed will float in the naptha and out of reach of the screw conveyor. As regards the seed itself, it is advantageous to solvent-wash and dry it before it is ball milled.

Originally, a perforated plate was placed at the exit of the ball mill in order to retain insufficiently ground seed in the mill. This perforated plate clogged easily as the pomace in the slurry form has a tendency to bridge over the openings. A somewhat unsatisfactory solution consisted in placing a ¼ inch mesh screen at an angle in the discharge pipe leading from the mill. An alternative arrangement, which proved to be completely satisfactory, involves the use of a perforated plate in the exit line of the ball mill, the surfaces of this plate being kept clean by the action of two cylindrical brushes, these brushes being mounted so as to come in contact with both surfaces of the plate. These brushes were made of pig bristle, and were arranged to rotate with respect to the mill. No discharge difficulties are observed with this present arrangement.

Extracting solvent

The solvent used in the extracting and comminuting operation is preferably of the saturated, acyclic hydrocarbon type. It has been found that the presence of aromatic or other cyclic hydrocarbons in the solvent cause the extraction of color bodies from the seed to an undesirable extent. The naphtha used in the illustrative example is a mixture of heptane, octane, and nonane. The use of paraffinic hydrocarbons boiling lower than 60° C., as solvent, requires maintenance of pressure in the system in order to reach the temperatures at which the proteins in the seed are denatured and coagulated. However, such hydrocarbons, including propane, may be used as the extraction solvent where it is feasible to maintain the entire extraction system under pressure. The use of excessively high boiling hydrocarbons (e. g., boiling point over about 250° C.) is not desirable, since they could not be separated as readily as the preferred solvent from the oil in the distillation operation. Also, high boiling solvents are difficult to remove completely from the pomace in the drier. Individual hydrocarbons, such as hexane, heptane and octane, may be used, but there is an economic advantage to using mixtures of such hydrocarbons.

In connection with the denaturation of the protein, the use of heat for the denaturation may be supplanted by the use of chemicals in the process of the present invention. For this purpose, chemicals, such as formaldehyde, tannic acid, acetic acid, mineral acids and heavy metal salts, are effective. Lead salts are the preferred heavy metal compounds, since their use causes no discoloration of the oil or protein.

The proportion of solvent to seed is, in the illustrative example, about 5 to 1, on a weight basis. This is not necessarily the optimum relationship, as less solvent would have to be handled and recovered if the proportion were 3 to 1 or 2 to 1. However, the use of the solvent in the proportion indicated in the illustrative example provides a slurry which is fluid enough to be readily handled, and concentrated enough so that the separation effected in the chilling step is an economical operation.

When a low solvent-to-seed ratio is used, it is not possible to produce a suitably oil-free seed meal in one contact of the solvent with the seed. The seed meal filter cake must be re-slurried with solvent and subsequently filtered in order to reduce the oil in the cake to a desired level. The steps of contacting the meal with solvent and filtering may desirably be repeated one or more times. When a high solvent-to-seed ratio is used, distillation of large volumes of solvent from the miscella is required. However, a suitably oil-free seed meal can be obtained in fewer contacts of the solvent with the seed. The desirability of using a high solvent-to-seed ratio will be determined by balancing the economic factors involved, such as the cost of steam used in the distillation step versus the cost of successive extraction steps. In any event, it is desirable to use a solvent-to-seed ratio which will produce a readily flowing slurry of solids and miscella, so that no difficulty is encountered in transporting the slurry from the mill to subsequent treatment stages.

Filtration and other process steps

It is important to provide a proper pump to handle the slurry which is discharged from the comminuting machine or ball mill. A continuous screw-type pump, which has small discharge lines to give fairly high velocity, has proven to be eminently suitable for moving this slurry. Open impeller centrifugal pumps may also be used when high capacities are involved.

There are two steps involved in the filtration of the slurry discharged from the heating tank, and both steps presented complicated problems. The first step involves separating the miscella from the solid constituents of the slurry by means of a filter. In this connection, it was found that the pomace settles out of the solvent at a very fast rate, and, in order to prevent clogging of the lines, it was found to be advantageous to provide effective agitation in the heating tank and to pump the slurry through the lines at a rapid rate. The filtration of the slurry is also greatly benefited by the treatment in the heating tank, since this heat treatment prevents the coating of the filters with slimy deposit during the filtration operation. The actual filtration may be effected in a continuous manner by the use of a rotary hopper vacuum filter, as herein described.

The rotary hopper or rotary compartment vacuum dewaterer is a rotary type filter having compartments mounted on its rim. Its operation comprises dropping the slurry into the compartments at the top of the drum cycle. The solvent is drawn into the drum of the filter by means of the vacuum or differential pressure; and the compartment walls serve to prevent the solid particles from dropping from the drum until the solvent has been so removed. When a compartment reaches the bottom of the drum cycle, the deposited filter cake drops or is blown out into a suitable receptacle. The compartment then returns to the top position, where it is refilled with slurry. A refinement which permits great flexibility in the use of this filter comprises discharging the compartments through separate lines, thereby enabling segregation of different fractions of the filtrate.

The particular rotary filter herein described has a number of definite advantages over other types of filters, such as centrifugal filters. For example, the filter preferred for use in the present process permits removal of all fines so that subsequent processing equipment does not become clogged. This is of particular importance in continuously operating the process.

Particularly satisfactory results were obtained when the filter cloth 45 was a single layer of heavy nylon cloth having approximately 34,000 openings per square inch, and a backing layer comprising a 100-mesh screen directly supported the fine mesh nylon cloth. With this particular type of arrangement of filter cloth, a 20-mesh screen was satisfactory for the layer 44. This arrangement gave a perfectly clear filtrate. The number of openings per square inch in the filter cloth is preferably in excess of 10,000.

The desirable effect of heating the slurry may be attributed to coagulation of the protein present in the pomace. In the case of the illustrative example presented herein, the denaturing is carried out in a tank which has about a 50 gallon capacity and will retain the slurry for at least about 30 minutes. The treatment of the slurry at about 150°–160° F. is effected while the slurry is being agitated. The indicated temperature range has been found to be the preferable range for this heat treatment.

The second step in the filtration operation involves washing adhering miscella from the meal before the latter is dropped from the filter compartment, fresh solvent being used for this purpose. The effluent from this washing operation is collected separately from the straight miscella, this being possible through the use of a separate discharge line for the washing operation.

An alternative procedure consists in reducing the oil content of the pomace by washing the same with alcohol instead of with the hydrocarbon solvent used in the main extraction operation. An additional fraction thus obtained contains lecithin, and is highly suitable for use as an anti-oxidant, as a wetting or emulsifying agent, as a lubricant in the processing of leather, as an ingredient of paper sizing, of soap stock, or of fat-liquoring compositions, and the like.

The seed hulls may be separated from the rest of the filter cake by a flotation process. The separated hull material is an important and useful abrasive.

One of the advantages of the process of this invention is that the seed proceeds through the solvent extraction equipment at a rapid rate. Even so, it is important that the seed should have a minimal moisture content, as otherwise objectionable amounts of fatty acids and glycerin are formed during the extraction operation. It is also desirable to incorporate inhibiting agents for the seed enzymes at the comminution step of the process; tannins are among the suitable inhibiting (coagulating) agents for the enzymes.

*Advantage of the process*

The advantages of the present process include: compactness and portability; small amounts of solvent required; the small amount of material which is being processed at any one time; improved processing with lower costs through replacement of prior art steps of hydraulic pressing, solvent extraction, and refining with one continuous operation.

It has not previously been possible to construct a unit for the extraction of castor seed and the like which could be readily transported in operating condition to the various geographical centers at which the materials to be subjected to the process of this invention are produced. Equipment suitable for carrying out the process of this invention can be installed for example, on a trailer truck, railway car, or a small boat. Various factors cooperate to make possible the small, readily transportable extraction unit of this invention. Thus, the quantity of solvent required is comparatively small. The filtering arrangement and the heating unit are small. Also, the rapid throughput of seed, together with the small amount of seed being processed at any one time, enable the use of a small extraction unit.

Prior art processes for the production of castor oil involve the use of hydraulic pressing equipment, which is not adapted to continuous operation, and requires a considerable amount of manual manipulation. While solvent extraction has been used in the prior art, the novel processing steps of this invention, namely the continuous comminution of a seed in a ball mill in the presence of a solvent, and the use of a rotary hopper dewaterer in the separation of the solids from the miscella, for producing oil from the seeds containing same have not hitherto been available. And the advantages which accrue from refining in solution according to the process of this invention, namely, improved oil color, reduced fatty acid content of the oil, and ease of refining at room temperatures as opposed to the elevated temperatures required by the prior art, serve to increase the benefits which can be derived from operating according to the instant process. It can readily be appreciated that the combination of the steps of the present invention into one continuous operation requiring a minimum operating staff provides a highly useful and novel process for the production of oil from oil-containing seed.

The process of this invention turns out a large yield of oil per unit of time, and this is one of the factors which permits the design of extraction units which have only a small amount of material being processed at any one time. In previous processes, prolonged contact and heating of the seed with the solvent were required. However, the finely ground seed used in the present process permits ready contact of the seed with the solvent, and, consequently, rapid solution of the oil in the solvent. Thus, the problems encountered with the leaching operation in previous processes are completely obviated in the process of the present invention.

What is claimed is:

1. In a continuous process for the manufacture of castor oil by the solvent extraction of castor seed containing said oil, the step of separating the miscella from the solids of a slurry by thickening and compacting the solids of the slurry on one surface of a perforate filtering element while subjecting the slurry to suction applied to the opposite surface of said element to produce a substantially solids-free miscella and rotating said element on a horizontal axis.

2. The process of claim 1, in which said solids are contacted with additional quantities of solvent during said thickening and compacting step in order to free said solids from residual amounts of said castor oil.

3. In a continuous process for the manufacture of castor oil by the solvent extraction of castor seed, the steps of preparing a suspension comprising miscella including castor oil dissolved in a volatile, aliphatic hydrocarbon solvent and seed solids, and continuously applying differential pressure to successive portions of said suspension in contact with a perforate filtering element to separate the miscella from the solids, and rotating said element on a horizontal axis.

4. Apparatus for use in the manufacture of castor oil by the solvent extraction of castor seed which comprises a ball mill having a perforated plate mounted in the exit line thereof, the perforations of said plate being of such size that insufficiently ground seed is retained in said ball mill, a brush mounted on the ball mill side of said plate, means for rotating said mill, said brush being mounted for rotation with respect to said perforated plate as the ball mill rotates so that the bristles of said brush contact successive portions of the surface of said perforated plate during rotation.

5. Apparatus for use in the manufacture of castor oil by the solvent extraction of castor seed which comprises a ball mill having a perforated plate mounted in the exit line thereof, the perforations of said plate being of such size that insufficiently ground seed is retained in said ball mill, a brush mounted on the ball mill side of said plate, means for rotating said mill, said brush being mounted for rotation with respect to said perforated plate as the ball mill rotates so that the bristles of said brush contact successive portions of the surface of said perforated plate during rotation, said perforations flaring outwardly with respect to the interior of said mill.

JAMES S. F. CARTER.

REFERENCES CITED

The following references are of record in the file of this patent:

UNITED STATES PATENTS

| Number | Name | Date |
| --- | --- | --- |
| 2,467,403 | Pascal | Apr. 19, 1949 |
| 2,502,484 | Saunders | Apr. 4, 1950 |